(12) United States Patent
El Hattami et al.

(10) Patent No.: US 12,487,818 B2
(45) Date of Patent: Dec. 2, 2025

(54) INTERACTIVE CHATBOT DOCUMENTATION

(71) Applicant: ServiceNow, Inc., Santa Clara, CA (US)

(72) Inventors: Amine El Hattami, Montreal (CA); Christopher Joseph Pal, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 217 days.

(21) Appl. No.: 18/141,104

(22) Filed: Apr. 28, 2023

(65) Prior Publication Data
US 2024/0362019 A1 Oct. 31, 2024

(51) Int. Cl.
| | |
|---|---|
| G06F 8/30 | (2018.01) |
| G06F 8/33 | (2018.01) |
| G06F 8/73 | (2018.01) |
| G06F 16/3329 | (2025.01) |
| G06F 8/51 | (2018.01) |
| G06F 8/61 | (2018.01) |

(52) U.S. Cl.
CPC ............ *G06F 8/73* (2013.01); *G06F 16/3329* (2019.01); *G06F 8/30* (2013.01); *G06F 8/33* (2013.01); *G06F 8/51* (2013.01); *G06F 8/63* (2013.01)

(58) Field of Classification Search
CPC .......... G06F 8/73; G06F 16/3329; G06F 8/63; G06F 8/33; G06F 8/30; G06F 8/51
See application file for complete search history.

(56) References Cited

U.S. PATENT DOCUMENTS

| | | | |
|---|---|---|---|
| 2019/0034522 A1* | 1/2019 | Kim | G06F 16/3329 |
| 2019/0294728 A1* | 9/2019 | Kohlmeier | G06N 5/022 |
| 2019/0317885 A1* | 10/2019 | Heinecke | G06F 11/3698 |
| 2020/0133662 A1* | 4/2020 | Smith | G06N 3/045 |
| 2023/0040412 A1* | 2/2023 | Ramsl | G06F 8/73 |
| 2023/0168885 A1* | 6/2023 | Youngblood | G06F 16/2379 717/123 |
| 2023/0393832 A1* | 12/2023 | Touati | H04L 67/10 |
| 2024/0020115 A1* | 1/2024 | Qian | H04L 67/535 |
| 2024/0249072 A1* | 7/2024 | Ting | G06F 16/3329 |
| 2024/0273123 A1* | 8/2024 | Costa | G06F 40/30 |
| 2024/0402999 A1* | 12/2024 | Chen | G06F 8/33 |

* cited by examiner

*Primary Examiner* — Anibal Riveracruz
(74) *Attorney, Agent, or Firm* — McDonnell Boehnen Hulbert & Berghoff LLP

(57) ABSTRACT

Metadata associated with program code documentation is identified, wherein the program code documentation is associated with corresponding program code. A natural language question regarding the corresponding program code is obtained via a virtual agent. A response to the natural language question is determined based on the metadata using one or more trained machine learning models. The response to the natural language question is provided to the virtual agent.

20 Claims, 5 Drawing Sheets

INTERACTIVE CHATBOT DOCUMENTATION

BACKGROUND OF THE INVENTION

Software and application programming interface (API) documentation includes information created to describe the use, functionality, or architecture of a software product, system, or service. Software and API documentation is helpful for developers and end-users. It may include technical manuals or online versions of manuals and help capabilities. It is often incorporated into the software's user interface or included as part of the help menu.

Effective documentation helps users to get familiar with the software and its features. It has a significant role in driving user acceptance. Effective documentation can also reduce the burden on support teams because it gives users the power to troubleshoot issues. As software development becomes more complicated and formalized, software and API documentation becomes increasingly important. Therefore, improved techniques for providing software and API documentation would be desirable.

BRIEF DESCRIPTION OF THE DRAWINGS

Various embodiments of the invention are disclosed in the following detailed description and the accompanying drawings.

DETAILED DESCRIPTION

Figure 1:
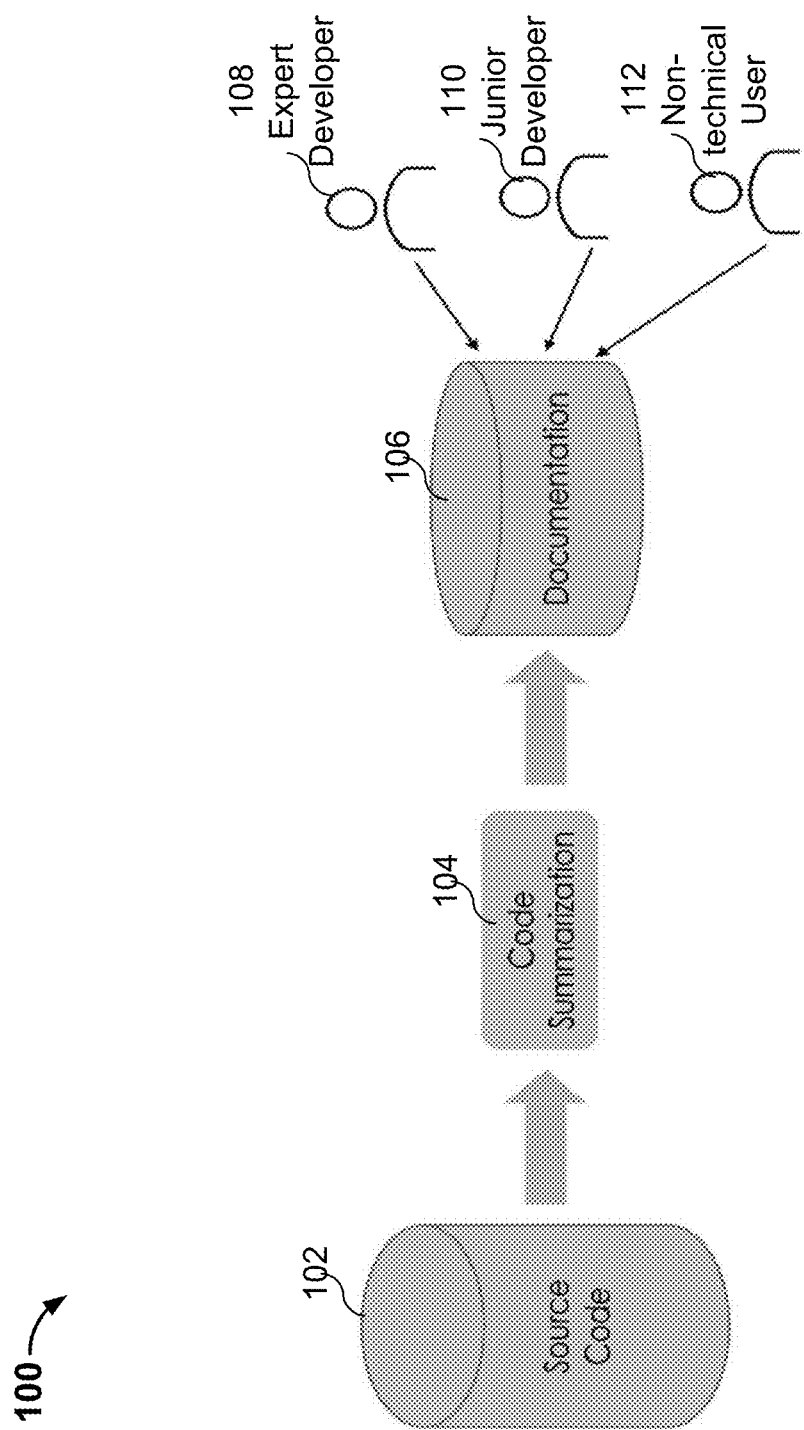
FIG. 1 illustrates a typical software and API documentation system 100.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Software and API documentation utilizes code summarization and code generation techniques to produce documentation content. Code summarization automatically generates descriptions for computer programs directly from the source code. Code summarization explains the logic and functions of source code using natural language processing. Code summaries provided along with code snippets help developers better comprehend source code. Snippet is a programming term for a small region of re-usable source code, machine code, or text. Moreover, code summaries are useful in other applications, such as code search. Efficient code summarization is important for program comprehension and maintenance because it can reduce the time needed for developers to understand the source code and improve code search efficiency.

Code generation automatically generates code based on natural language intent, e.g., description of requirements. Efficient code generation is important for software development because it can reduce the time needed for programmers to develop source codes that satisfy the various requirements.

In some circumstances, software documentation is deployed as a static set of files that contains functional descriptions and code snippets for functions, configurations, and the like. FIG. 1 illustrates a typical software and API documentation system 100. Documentation system 100 includes a source code database 102, a code summarization module 104 that automatically generates descriptions for functions and computer programs directly from the source code database 102, and a documentation database 106 that contains descriptions and code snippets for functions, configurations, and the like.

Documentation system 100 may be deployed to various users. These users may include individuals having varying levels of expertise and different profiles, such as expert or advanced developers 108, junior developers 110, and non-technical users 112. However, existing documentation is typically tailored to a standard user profile of a user. For example, existing documentation may be designed based on certain assumptions about prior knowledge of the user.

Some techniques attempt to solve this issue by having documentation including multiple levels of detail. Documentation with multiple levels of details has many drawbacks. First, the documentation is limited to user profiles that were identified before generation of the documentation. Accordingly, the documentation is limited in its applicability. Second, the documentation includes a relatively large amount of text and thus may be difficult for an individual to efficiently understand. For example, a non-technical user may often need to read through advanced details before finding the required information.

Various embodiments disclosed herein include deep-learning based techniques to provide documentation using a virtual agent (e.g., a chatbot). A chatbot is a computer program that uses artificial intelligence (AI) and natural language processing (NLP) to understand user questions and automate responses to them, simulating human conversation. A user may ask the chatbot to provide documentation for a software or an API. The content of the documentation and the language used are tailored to the user profile and the user's prior knowledge. Further, the improved techniques rely on actual information retrieval to insure the correctness of the information. The advantage is that it avoids hallucinations. In artificial intelligence (AI), a hallucination or artificial hallucination is a confident response by an AI that does not seem to be justified by its training data.

In the present application, a method for providing interactive documentation based on a chatbot and deep-learning based techniques is disclosed. Metadata associated with program code documentation is identified, wherein the program code documentation is associated with corresponding program code. A natural language question regarding the corresponding program code is obtained via a virtual agent. A response to the natural language question is determined based on the metadata using one or more trained machine learning models. The response to the natural language question is provided to the virtual agent.

In the present application, a system for providing interactive documentation based on a chatbot and deep-learning based techniques is disclosed. Metadata associated with program code documentation is identified, wherein the program code documentation is associated with corresponding program code. A natural language question regarding the corresponding program code is obtained via a virtual agent. A response to the natural language question is determined based on the metadata using one or more trained machine learning models. The response to the natural language question is provided to the virtual agent.

In the present application, a computer program product embodied in a non-transitory computer readable medium and comprising computer instructions for providing interactive documentation based on a chatbot and deep-learning based techniques is disclosed. Metadata associated with program code documentation is identified, wherein the program code documentation is associated with corresponding program code. A natural language question regarding the corresponding program code is obtained via a virtual agent. A response to the natural language question is determined based on the metadata using one or more trained machine learning models. The response to the natural language question is provided to the virtual agent.

Figure 2:
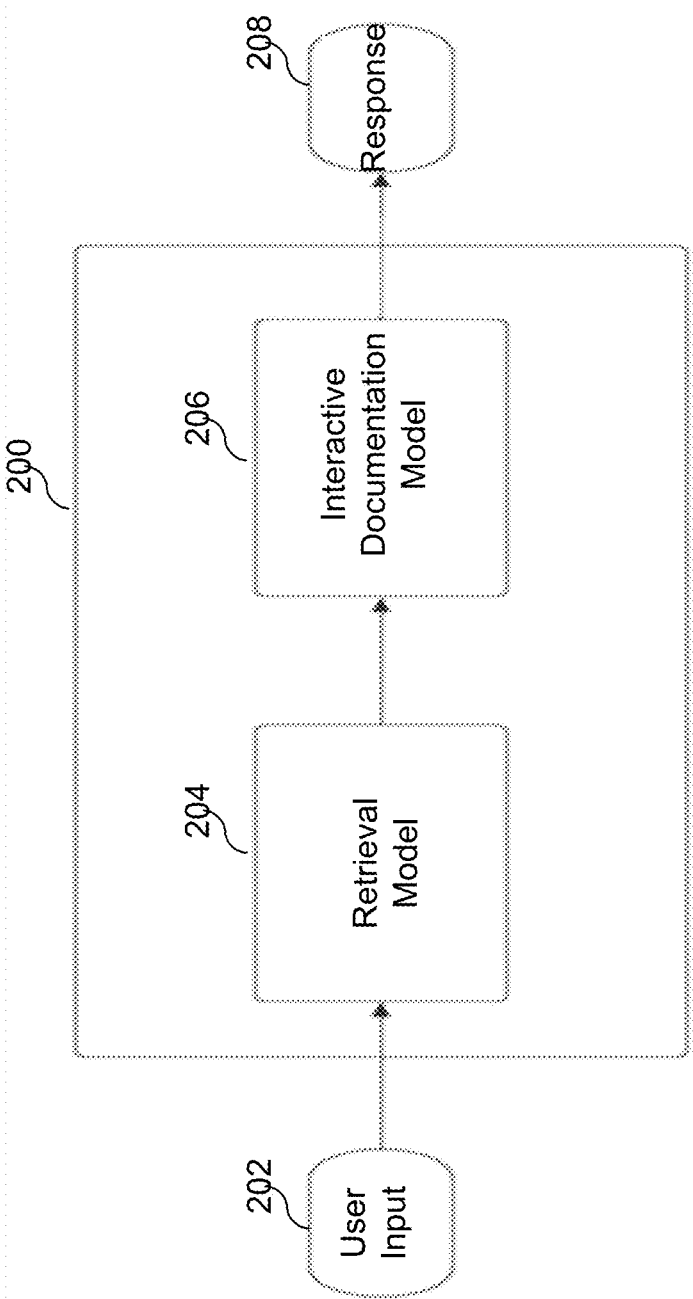
FIG. 2 illustrates an exemplary interactive software and API documentation chatbot system 200.
Figure 3:
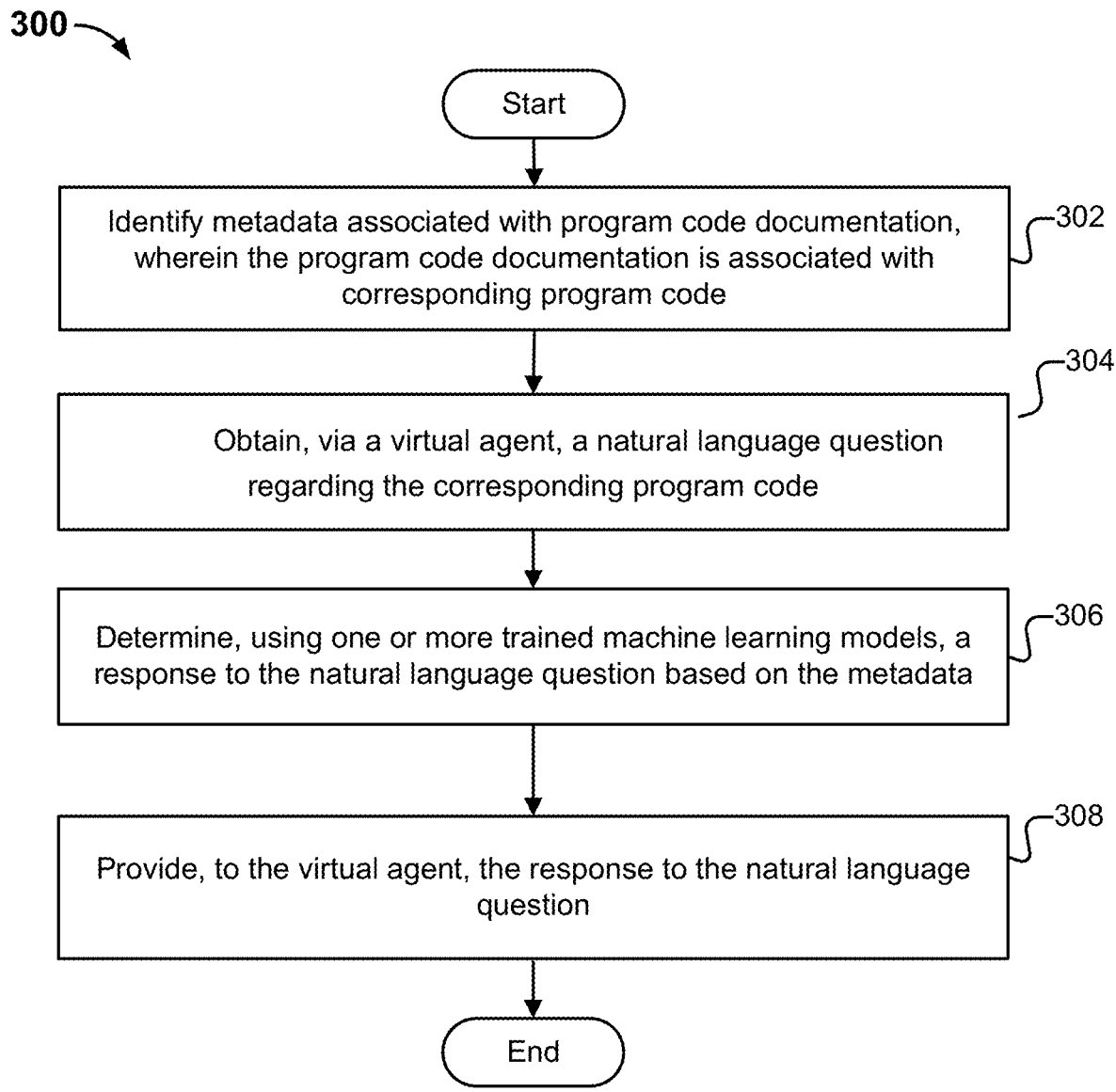
FIG. 3 illustrates an exemplary process 300 for providing interactive documentation based on a chatbot and deep-learning based techniques.

FIG. 2 illustrates an exemplary interactive software and API documentation chatbot system 200. FIG. 3 illustrates an exemplary process 300 for providing interactive documentation based on a chatbot and deep-learning based techniques. In some embodiments, process 300 is performed by interactive software and API documentation chatbot system 200.

As shown in FIG. 2, user input 202 is first sent to a retrieval model 204 to get a list of existing information to answer the user request. This list of information is then sent to an interactive documentation model 206 to generate a response 208 that may include text, code snippets or both. The existing information retrieved by retrieval model 204 is preprocessed by the system.

At step 302, metadata associated with program code documentation is identified, wherein the program code documentation is associated with corresponding program code. The program code documentation includes information regarding the corresponding program code or contents specifying at least one or more program code examples. For example, the documentation includes descriptions and code snippets for functions, configurations, and the like. Specific examples of using the functions with different parameters or arguments may be provided as part of the documentation. The advantage of preprocessing the documentation to identify metadata is to facilitate the effective retrieval of information by retrieval model 204, which sends the retrieved information to interactive documentation model 206 for generating a response 208 for the user.

The metadata characterizes different sections included in the program code documentation. The metadata included in the documentation may include complexity scores. For example, one type of code complexity score that may be calculated for a snippet is based on cyclomatic complexity. Cyclomatic complexity is a software metric used to indicate the complexity of a program. It is a quantitative measure of the number of linearly independent paths through a program's source code. Cyclomatic complexity is computed using the control-flow graph of the program: the nodes of the graph correspond to indivisible groups of commands of a program, and a directed edge connects two nodes if the second command might be executed immediately after the first command. Cyclomatic complexity may also be applied to individual functions, modules, methods, or classes within a program.

For example, the additional information may include a difficulty score computed using automated applications. Other additional information may be generated by a static code analysis tool. For example, Pylint is a static code analysis tool for the Python programming language. Other additional information may include any extra libraries or technology used in the source code or code snippet. For example, a dataset with a Python code snippet may include the following additional information:

Language: Python
Code: def funcX ( ) . . . .
Difficulty: 5.55
Extra: Webserver, compression, . . .

Documentation complexity scores may be based on different metrics. One simple metric may measure the number of words in a sentence. Another simple metric may measure the number of letters in the words. Documentation complexity scores may also be based on different NLP metrics. One way to assess textual complexity is textual readability: how readable is the text. Another way to assess textual complexity is textual richness: how rich is the text.

Metadata includes prerequisite knowledge associated with the different sections included in the program code documentation. Metadata includes a list of prerequisite knowledge associated with descriptions, code snippets, code summaries, and the like. For example, the prerequisite knowledge associated with a child class may include information about the parent class.

With reference to FIG. 3, at 304, a natural language question regarding the corresponding program code is received as a part of a chatbot conversation via a virtual agent, such as a chatbot agent. User input 202 may include a part of or the entire conversation between the user and interactive software and API documentation chatbot system 200, starting with the first utterance. A user may provide information about his profile as part of user input 202. For example, the user may request the following: "I am a non-technical user and I would like to know how function X works" or "How does function X work? Please explain it as if I am a five-year-old." The user may request the following: "I am an advanced user but English is not my first language." This information is useful because the system may be trained to respond with contents that include great technical details but that are described in simpler sentences. User input 202 may also include prior knowledge that the user has or does not have. For example, the user may say "I do not have knowledge about how technology Y works, but can you explain how function X works?" In each situation, interactive software and API documentation chatbot system 200 provides a tailored response based on the restriction or information provided by the user.

Retrieval model 204 ensures that the information provided by interactive software and API documentation chatbot system 200 is always accurate. This solves the hallucination issues of large deep-learning models. Hallucination is a well-known phenomenon in AI models, in which the system provides an answer that is factually incorrect, irrelevant, or nonsensical, because of limitations in its training data and architecture. Recent work showed that large deep-learning models may invent facts, which is a major concern when providing documentation. Retrieval model 204 may use any techniques, e.g., neural retrieval models or neural ranking models for information retrieval (IR), that receive a text input and return a ranked list of possible pointers in both text and source code. Neural ranking models for information retrieval (IR) use shallow or deep neural networks to rank search results in response to a query. These models learn representations of language from raw text that can bridge the gap between query and document vocabulary. As the conversation progresses between the system and the user, retrieval model 204 is able to refine its search using the user responses.

Interactive documentation model 206 receives the output of retrieval model 204. Based on the output of retrieval model 204, interactive documentation model 206 may generate a coherent response 208 based on the output of retrieval model 204 and the user's level of knowledge.

With reference to FIG. 3, at 306, a response to the natural language question is determined using one or more trained machine learning models based on the metadata. Portions of the preprocessed documentation, including the metadata, may be retrieved by retrieval model 204 and sent to interactive documentation model 206 for generating a response 208 for the user.

Figure 4:
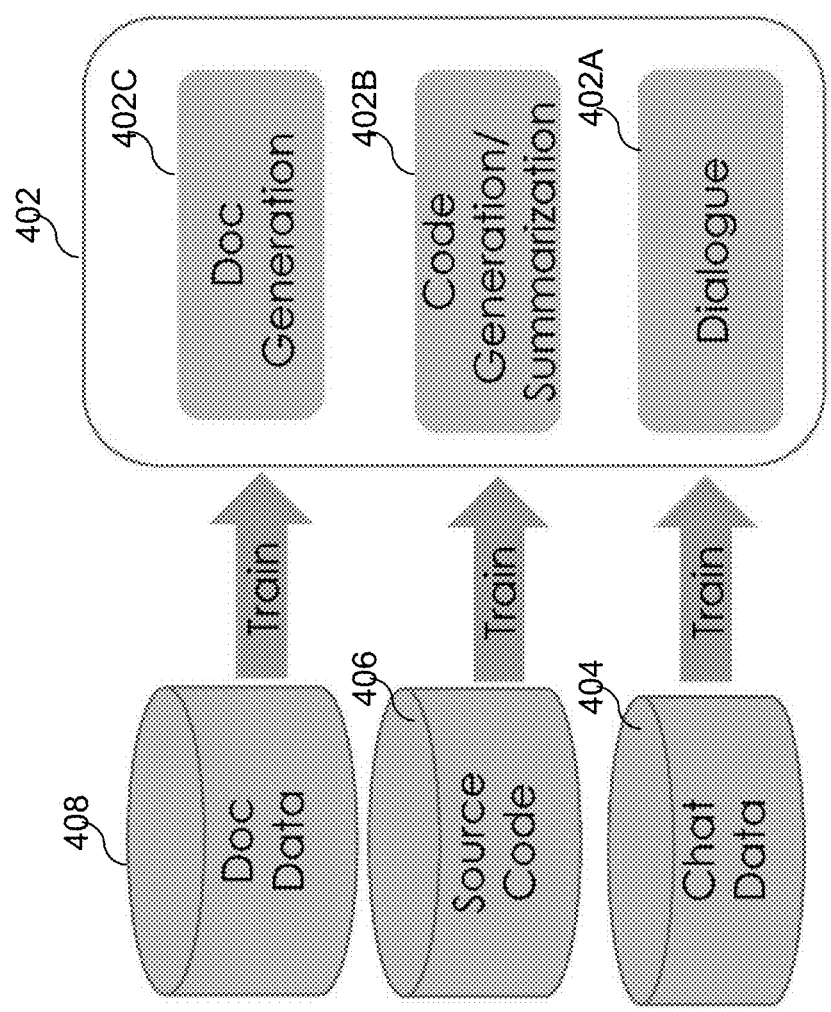
FIG. 4 illustrates an example of training an interactive documentation model 402.

FIG. 4 illustrates an example of training an interactive documentation model 402. In some embodiments, the trained interactive documentation model 402 may be used as interactive documentation model 206 to generate response 208 that may include text, code snippets, or both in interactive software and API documentation chatbot system 200 of FIG. 2.

Figure 5:
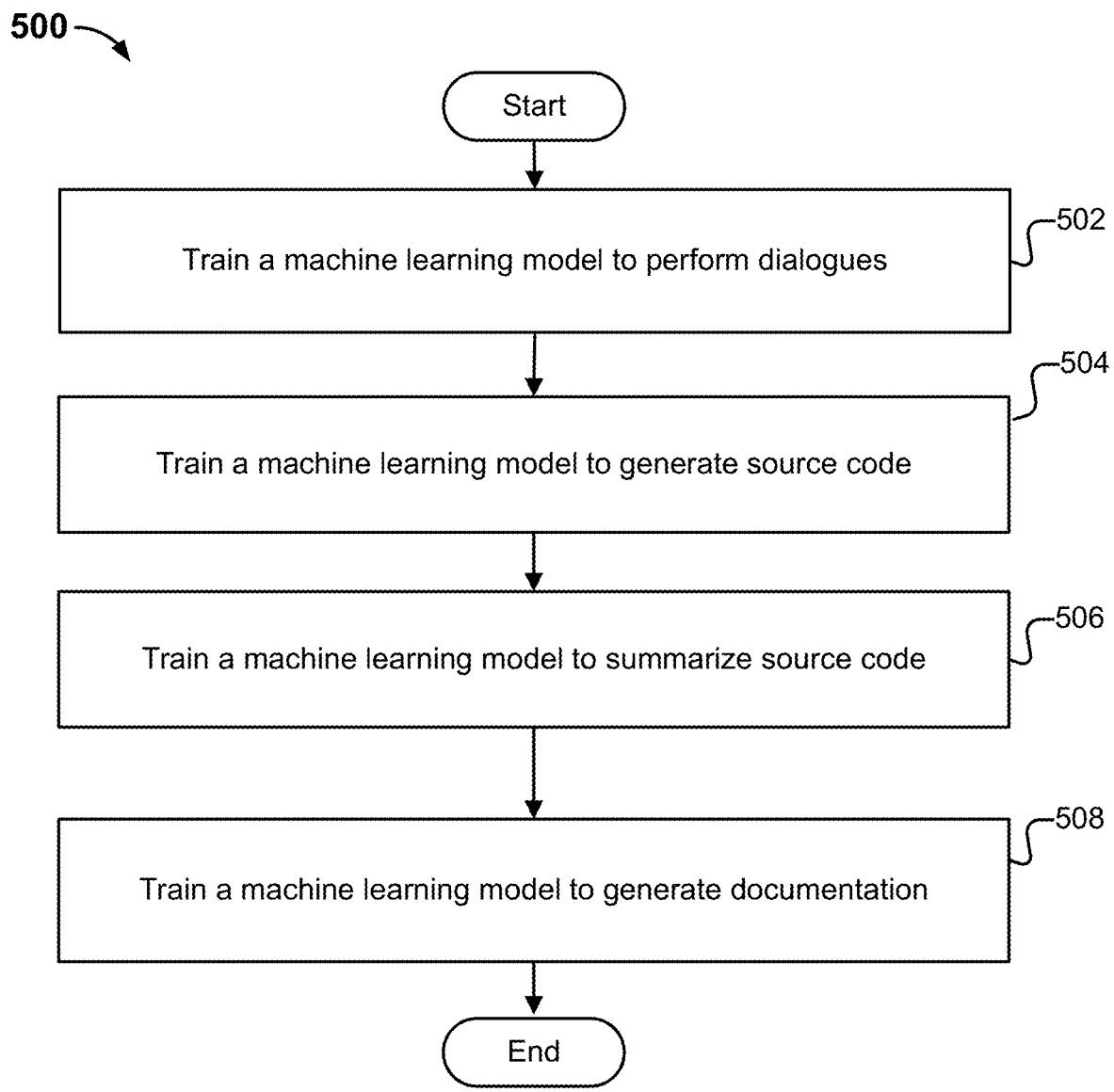
FIG. 5 illustrates an exemplary process 500 for training the machine learning models of interactive software and API documentation chatbot system 200.

Interactive documentation model 402 may be trained to perform different tasks. One of the tasks is a dialogue task 402A that is trained based on chat training data in database 404. Another task is a code generation/summarization task 402B that is trained based on source code training data in database 406. Yet another task is a document generation task 402C that is trained based on document training data in database 408. FIG. 5 illustrates an exemplary process 500 for training the machine learning models of interactive software and API documentation chatbot system 200.

At step 502, a machine learning model to perform dialogues is trained. Interactive documentation model 402 is trained to perform a dialogue between the user and interactive software and API documentation chatbot system 200 in an end-to-end format. The response may be generated based on some or all of the previous utterances and an extra context (e.g., the output of retrieval model 204). Retrieval model 204 may use any techniques, e.g., neural retrieval models or neural ranking models for information retrieval (IR), that receive a text input and return a ranked list of possible pointers in both text and source code. In some cases where retrieval model 204 returns an empty list, the model may generate a response to request the user to input additional details or inform the user that it does not have an answer. This is advantageous because it ensures that the information provided by interactive software and API documentation chatbot system 200 is always accurate. This solves the hallucination issues of large deep-learning models, in which the system provides an answer that is factually incorrect, irrelevant, or nonsensical.

At step 504, a machine learning model to perform code generation is trained. Interactive documentation model 402 is trained to perform code generation. The model is trained to generate source code based on either text input or other code snippets. In one example, the user asks about using function X with argument Z. However, retrieval model 204 cannot find an example with this criteria, but it can find snippets with function X using argument W and text documentation about argument Z. In such a situation, the model will generate on the fly snippets satisfying the required criteria, i.e., snippets with function X using argument Z. In another example, the user asks about using function X with argument Z. However, retrieval model 204 cannot find an example with this criteria in the latest version of a certain library, but it can find snippets with function X using argument Z in an older version of a certain library. In such a situation, the model will generate on the fly a semantically equivalent code using the newer version.

At step 506, a machine learning model to summarize source code or snippets is trained. Interactive documentation model 402 is trained to perform code summarization. The model is trained to generate text code summary from code snippets. In one example, the user asks what a function does, but retrieval model 204 cannot find any entries in the existing documentation but can find the code snippet. In such a case, the model will generate a summary of the code snippet.

For dialogue training, any dialogue or chat data in database 404 may be used by interactive documentation model 402 for training. For example, dialogues between the system and different users with varying levels of expertise, such as expert or advanced developers 108, junior developers 110, and non-technical users 112, may be used for training the model. Dialogues between the system and different users with different user profiles, such as users in different age-groups, users who speak in different languages, or users with different education or cultural backgrounds, may be used for training the model. Dialogue or chat data may also be collected from online technology forums.

Interactive documentation model 402 is trained to generate answers in the required complexity. For example, the model is trained to output an answer that matches the user input based on different information, including code/documentation complexity score, extra libraries and technologies, and the like. For example, the model is trained to output an answer (including the dialogue, the code snippets, the code summaries) that matches the user input based on the user's level of expertise, the user's profile, the user's age-group, the user's education background, or the user's first language based on code/documentation complexity scores.

For example, one type of code complexity score that may be calculated for a snippet is based on cyclomatic complexity. Cyclomatic complexity is a software metric used to indicate the complexity of a program. It is a quantitative measure of the number of linearly independent paths through a program's source code. Cyclomatic complexity is computed using the control-flow graph of the program: the nodes of the graph correspond to indivisible groups of commands of a program, and a directed edge connects two nodes if the second command might be executed immediately after the first command. Cyclomatic complexity may also be applied to individual functions, modules, methods, or classes within a program.

For example, documentation complexity scores may be based on different metrics. One simple metric may measure the number of words in a sentence. Another simple metric may measure the number of letters in the words. Documentation complexity scores may also be based on different NLP metrics. One way to assess textual complexity is textual readability: how readable is the text. Another way to assess textual complexity is textual richness: how rich is the text.

For code generation training, source code training data in database 406 may be used by interactive documentation model 402 for training. For example, source code training data in database 406 may include a dataset with a text summary and/or code snippets as the input training data, and it may further include a dataset with the target code as output training data. The code generated by interactive documentation model 402 may include the code provided to the user and a set of metadata associated with the code. For example, the set of metadata may include a difficulty score depending on the complexity of the code. The set of metadata may include a list of prerequisite knowledge associated with the code. For example, the code may be annotated with explanatory notes such as "The user is expected to know x, y, and z."

For code summarization training, source code training data in database 306 may be used by interactive documentation model 402 for training. For example, source code training data in database 406 may include a dataset with a piece of syntactically and semantically correct source code as input training data, and it may further include a dataset with a text summary and/or code snippet that is a representative summary of the piece of original source code. The code summary generated by interactive documentation model 402 may include the code summary provided to the user and a set of metadata associated with the code summary. For example, the set of metadata may include a difficulty score depending on the complexity of the code summary. The set of metadata may include a list of prerequisite knowledge associated with the code summary. For example, the code summary may be annotated with explanatory notes such as "The user is expected to know x, y, and z."

Database 406 includes source code repositories in multiple programming languages. In some embodiments, each dataset including the source code or the code snippet may include additional information about the source code or the code snippet. For example, the additional information may include a difficulty score computed using automated applications. Other additional information may be generated by a static code analysis tool. For example, Pylint is a static code analysis tool for the Python programming language. Other additional information may include any extra libraries or technology used in the source code or code snippet. For example, a dataset with a Python code snippet may include the following additional information:

Language: Python
Code: def funcX ( ) . . . .
Difficulty: 5.55
Extra: Webserver, compression, . . .

At step 508, a machine learning model to generate documentation is trained. For document generation training, document training data in database 408 may be used by interactive documentation model 402 for training. The document output generated by interactive documentation model 402 may include the documentation provided to the user and a set of metadata associated with the documentation. For example, the set of metadata may include a difficulty score depending on the depth of the explanation. The set of metadata may include a list of prerequisite knowledge associated with the documentation. For example, the documentation may be annotated with explanatory notes such as "The user is expected to know x, y, and z."

With reference to FIG. 3, at 308, a response to the natural language question is provided as a part of the chatbot conversation to the virtual agent. Interactive software and API documentation chatbot system 200 may perform multiple tasks (including documentation generation, code generation, code summarization, and dialogue generation) during a chatbot conversation as shown in the example described below. In this example, the user input 202 is "I am a novice developer and I would like to know how torch.ones is used and how I can create a tensor of length 10 on a GPU (graphics processing unit) in Python." Here, the user provides information about his profile (being a novice developer) as part of user input 202. User input 202 also includes other information, including the programming language (Python), the hardware device (GPU), the function name (torch.ones), and the parameter or argument associated with the function (a tensor of length 10).

The correct response that satisfies the criteria specified by the user should be torch.ones (10, device=torch.device ('cuda: 0')). Suppose that retrieval model 204 cannot find the exact example with the arguments shown above. In particular, retrieval model 204 cannot find any snippets showing how to use torch.ones on a GPU, but retrieval model 204 is able to find snippets showing how to use torch.ones on a central processing unit (CPU):

torch.ones ([2, 4], dtype=torch.float64),
torch.ones ([1, 3], dtype=torch.float32),
solver.solve (torch.ones (2))
torch.ones (1, dtype=torch.float32)

In addition, retrieval model 204 is able to find text documentation and snippets that are related to torch.ones and other arguments associated with torch.ones. For example, retrieval model 204 may find the text documentation: "A tensor of specific data type can be constructed by passing a torch.dtype and/or a torch.device to a constructor or tensor." Retrieval model 204 may also find a snippet using the argument "device": x=torch.tensor ([1., −1.], [1., 1.], device=torch.device ('cuda: 0')).

Using code summarization, code generation, documentation generation, and dialogue generation, interactive software and API documentation chatbot system 200 may generate the following output to the user, which includes text documentation that is directly extracted from the documents based on the user's profile as a novice developer, snippets that are directly extracted from the documents, snippets that are generated based on the retrieved information about torch.ones and that satisfy the required criteria, and the code summarization of the generated snippets:

The torch.ones function creates a tensor and the provided parameters and fills all the values with 1. Also, a tensor is a multi-dimensional matrix containing elements of a single data type. You can create a ones tensor using various shapes and data types.

For example:
torch.ones ([2, 4], dtype=torch.float64)
In this example, it is generating a tensor of shape [2, 4] with a data type of float64, which is a float type with 64 bits.

Another example:

torch.ones (1, dtype=torch.float32)

In this example, it is generating a tensor with a single element with a data type of float32, which is a float type with 32 bits.

Finally, you can create a ones tensor on GPU using:

torch.ones (10, device=torch.device ('cuda: 0'))

where device-torch.device ('cuda: 0') is how to create the tensor on GPU directly.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    performing a static code analysis on source code, the static code analysis to determine a number of execution paths through the source code;
    determining a complexity associated with program documentation of the source code based on the number of execution paths, wherein determining the complexity associated with the program documentation of the source code comprises automatically evaluating a control-flow graph of the source code, wherein nodes of the control-flow graph correspond to groups of commands of the source code, and wherein edges of the control-flow graph correspond to execution orderings of the groups of commands;
    obtaining, via a virtual agent, a natural language question regarding the source code;
    determining a response to the natural language question based on a neural ranking model and the complexity associated with the program documentation and the source code, wherein the neural ranking model returns a ranked list of information specifying one or more source code examples; and
    providing, to the virtual agent, the response to the natural language question.

2. The method of claim 1, wherein determining the complexity includes determining a complexity of a function of the source code that is included in the program documentation.

3. The method of claim 2, wherein determining the complexity includes determining: (i) a first complexity score associated with a first section of the program documentation and (ii) a second complexity score associated with a second section of the program documentation, and wherein the first complexity score is different from the second complexity score.

4. The method of claim 2, wherein the program documentation includes prerequisite knowledge associated with the function included in the program documentation.

5. The method of claim 1, further comprising:
    obtaining user information via the virtual agent, wherein the user information comprises one or more of:
    a level of expertise, a prior knowledge, an education level, or an age-group.

6. The method of claim 1, wherein the program documentation includes information regarding the source code or contents specifying at least one or more source code examples.

7. The method of claim 6, wherein the natural language question is a part of a chatbot conversation.

8. The method of claim 7, further comprising:
    providing the chatbot conversation to a retrieval model to retrieve data from the program documentation; and
    determining, using one or more trained machine learning models, the response to the natural language question based on the retrieved data.

9. The method of claim 8, wherein the retrieved data comprises one or more of: at least a portion of the information regarding the source code or at least a portion of the contents specifying the source code examples.

10. The method of claim 8, wherein the one or more trained machine learning models comprise a trained machine learning model used to perform a dialogue task dynamically tailored for one or more of: a level of expertise, a prior knowledge, an education level, or an age-group.

11. The method of claim 8, wherein the one or more trained machine learning models comprise a trained machine learning model used to perform a code generation task dynamically tailored for one or more of: a level of expertise or a prior knowledge.

12. The method of claim 8, wherein the one or more trained machine learning models comprise a trained machine learning model used to perform a code summarization task dynamically tailored for one or more of: a level of expertise or a prior knowledge.

13. The method of claim 8, wherein the one or more trained machine learning models comprise a trained machine learning model used to perform a document generation task dynamically tailored for one or more of: a level of expertise or a prior knowledge.

14. The method of claim 8, wherein the one or more trained machine learning models comprise a trained machine learning model used to perform one or more of: a dialogue task, a code generation task, or a code summarization task, and wherein the response to the natural language question comprises one or more of: a piece of dialogue generated by the dialogue task, a piece of code generated by the code generation task, or a code summarization generated by the code summarization task.

15. The method of claim 1, wherein determining the complexity associated with the program documentation of the source code comprises determining a cyclomatic complexity of the source code.

16. A system, comprising:
    memory;
    instructions in the memory; and
    one or more processors configured to execute the instructions to:
    perform a static code analysis on source code, the static code analysis to determine a number of execution paths through the source code;
    determine a complexity associated with program documentation of the source code based on the number of execution paths, wherein determining the complexity associated with the program documentation of the source code comprises automatically evaluating a control-flow graph of the source code, wherein nodes of the control-flow graph correspond to groups of commands of the source code, and wherein edges of the control-flow graph correspond to execution orderings of the groups of commands;
    obtain, via a virtual agent, a natural language question regarding the source code;
    determine a response to the natural language question based on a neural ranking model and the complexity associated with the program documentation and the source code, wherein the neural ranking model returns a ranked list of information specifying one or more source code examples; and provide, to the virtual agent, the response to the natural language question.

17. The system of claim 16, wherein the natural language question is a part of a chatbot conversation, and wherein the one or more processors are further configured to execute the instructions to:

provide the chatbot conversation to a retrieval model to retrieve data from the program documentation; and determine, using one or more trained machine learning models, the response to the natural language question based on the retrieved data.

18. The system of claim 16, wherein determining the complexity associated with the program documentation of the source code comprises determining a cyclomatic complexity of the source code.

19. A computer program product embodied in a non-transitory computer readable medium and comprising computer instructions for:

performing a static code analysis on source code, the static code analysis to determine a number of execution paths through the source code;

determining a complexity associated with program documentation of the source code based on the number of execution paths, wherein determining the complexity associated with the program documentation of the source code comprises automatically evaluating a control-flow graph of the source code, wherein nodes of the control-flow graph correspond to groups of commands of the source code, and wherein edges of the control-flow graph correspond to execution orderings of the groups of commands;

obtaining, via a virtual agent, a natural language question regarding the source code;

determining a response to the natural language question based on a neural ranking model and the complexity associated with the program documentation and the source code, wherein the neural ranking model returns a ranked list of information specifying one or more source code examples; and providing, to the virtual agent, the response to the natural language question.

20. The computer program product of claim 19, wherein determining the complexity associated with the program documentation of the source code comprises determining a cyclomatic complexity of the source code.

* * * * *